United States Patent [19]
Zaharia et al.

[11] Patent Number: 5,645,156
[45] Date of Patent: Jul. 8, 1997

[54] DEVICE FOR MONITORING ESCALATOR HANDRAIL SPEED

[75] Inventors: Vlad Zaharia, Rocky Hill, Conn.; Denis Cho, Campinas, Brazil

[73] Assignee: Otis Elevator Company, Farmington, Conn.

[21] Appl. No.: 115,331

[22] Filed: Sep. 1, 1993

[51] Int. Cl.[6] .................................................. B65G 43/00
[52] U.S. Cl. ........................................ 198/323; 198/502.4
[58] Field of Search ................................... 198/322, 323, 198/331, 502.4, 810, 810.01

[56] References Cited

U.S. PATENT DOCUMENTS

| | | | |
|---|---|---|---|
| 3,780,297 | 12/1973 | Geary | 198/810 |
| 3,845,375 | 10/1974 | Stiebel | 198/810 |
| 4,448,820 | 5/1984 | Buschor | 198/810 |
| 5,072,820 | 12/1991 | Steffen et al. | 198/323 |
| 5,090,551 | 2/1992 | Yasuhara et al. | 198/323 |
| 5,092,446 | 3/1992 | Sullivan, Jr. et al. | 198/323 |

*Primary Examiner*—Joseph E. Valenza

[57] ABSTRACT

An improved escalator 10 which incorporates a device 58 which monitors the speed of an escalator handrail 12. The escalator having a handrail and a transmission unit 14. The device cooperates with a portion of the transmission unit that moves at the same speed as the handrail. Various details are developed which facilitate the monitoring of the handrail speed. In one detailed embodiment, the device includes a plurality of targets 60 and a sensor 62 which is not interfered with by the handrail.

7 Claims, 2 Drawing Sheets

DEVICE FOR MONITORING ESCALATOR HANDRAIL SPEED

TECHNICAL FIELD

The present invention relates to an escalator, and more particularly, a device which monitors the speed of a handrail.

BACKGROUND ART

An escalator moves passengers from one level in a building to another. The main elements of the escalator are an electric motor, a plurality of steps, two handrails on either side of the steps, a transmission unit and a frame. The electric motor drives the steps and the handrails through the transmission unit. It is critical to the safety of the passengers that the steps and the handrails travel at the same speed.

Currently, two devices may determine the handrails' speed and stop the escalator if the speed of the steps differs a predetermined amount from the speed of the handrails. The first device utilizes an escalator with a junction box as the transmission unit. The junction box consists of a shaft and two sprockets spaced along the shaft. One sprocket receives power from the motor and the other transmits power to the handrail. The junction box transmits power through chains.

The first device has a multiplicity of targets, two disks, two photosensors and external circuitry. The disks are attached at spaced locations on the shaft. The targets line the edge of each of the disk. The photosensors are mounted on the junction box adjacent to the disks and detect the speed differential between the disks. The external circuitry calculates the speed of the handrail from this data and transmits this information to a controller.

This device is unreliable due to backlash. Play in the links of the chains cause inaccurate sensor readings.

The second prior art device utilizes an escalator with a drive wheel, a guide and a pulley assembly as the transmission unit. The drive wheel receives power from the motor. The guide supports the handrail. The pulley assembly forces the handrail into contact with the drive wheel, so that power transfers efficiently.

The second device has a roller and an inductive sensor. A bracket supports the roller and the sensor. The bracket bolts to the guide. The roller bolts to the bracket. A surface of the roller comes into frictional contact with the handrail. The roller offers no resistance to the friction force created by the contact, so the roller revolves about a bolt at a speed equal to that of the handrail. A spring attaches to the bracket and forces the roller into contact with the handrail. Two sensor targets are mounted on the roller face at predetermined circumferentially disposed locations.

The sensor is cylindrical. It is disposed axially through the bracket at a position which facilitates detection of the targets. A gap exists between the sensor and the roller. The sensor emits and receives pulse signals as it detects the targets. Through various electrical components, the signals' frequency is converted to indicate the speed of the roller. Recall, the roller speed is also that of the handrail. If the speed of the handrails falls outside of preset limits, the sensor sends a signal to a controller of the escalator to sound an alarm and to stop the steps and the handrails simultaneously.

During operative conditions the escalator experiences vibrations, changes in direction and uneven forces on the handrail, which may result when a passenger leans to heavily on one of the handrails. These events warp the handrail away from the guide and exert forces on the roller. These forces move the roller upward away from the handrail. However, the spring mounting of the roller forces it downward back into contact with the handrail.

This device has two main problems; reliability and alignment. The sensor detects targets that are attached to the roller and any irregular movement of the handrail jostles the roller due to insufficient contact surface between the roller and the handrail. This causes the speed measurements to fluctuate and as a result the escalator often cuts off unnecessarily. Another problem is the sensor requires recurrent adjustment of its axial position to maintain the gap between the sensor and the roller. The cylindrical sensor is disposed through the bracket. When the handrail jostles the roller, it also jostles the sensor, which moves the sensor into contact with the roller. This contact may have several consequences for the sensor. The contact may throw off the readings of the sensor until adjustment can be made, it may shut off the escalator unnecessarily or it may damage or destroy the sensor.

The prior art device is also expensive. The bracket requires detailed machining, so that it can be adapted to connect to the handrail guide and to support many of the components of the device.

DISCLOSURE OF INVENTION

It is accordingly an object of the present invention to utilize a device which monitors the handrail speed, which is not adversely affected by the operative conditions of the escalator. Additional objects of the present invention are that the operability of the device does not require adjustment and that the device be inexpensive to manufacture.

According to the present invention, an improved escalator incorporates a device for monitoring handrail speed, which comprises means for contacting the handrail along an extended surface which moves at the same speed as the handrail uninterrupted by the operative conditions of the escalator and a sensor assembly which cooperates with the means for contacting and is not interfered with by the handrail.

Further according to the present invention, the means for contacting may be a preexisting element of the escalator which forces the handrail into contact with its driving mechanism.

The primary advantage of the present invention is the reliability of the measurements obtained, which results from mounting targets of the sensor assembly on surfaces which operate without jostling from the handrail, because the means for contacting has an extended surface of contact with the handrail it minimizes the vibrations from erratic handrail movements. Another advantage of the present invention is the permanence of the sensor assembly's position, which results from not mounting the sensor on a bracket with the means for contacting. Thus, allowing the sensor to require minimal adjustment during its operative life. Yet another advantage is the cost of the present invention which results from the simplicity of the invention and the fact that it may utilize a preexisting element of an escalator, which runs at the same speed as the handrail, rather than building an element to perform this function.

The foregoing features and advantages of the present invention will become more apparent in light of the following detailed description of the best mode for carrying out the invention and accompanying drawings.

BEST MODE FOR CARRYING OUT THE INVENTION

Figure 1:
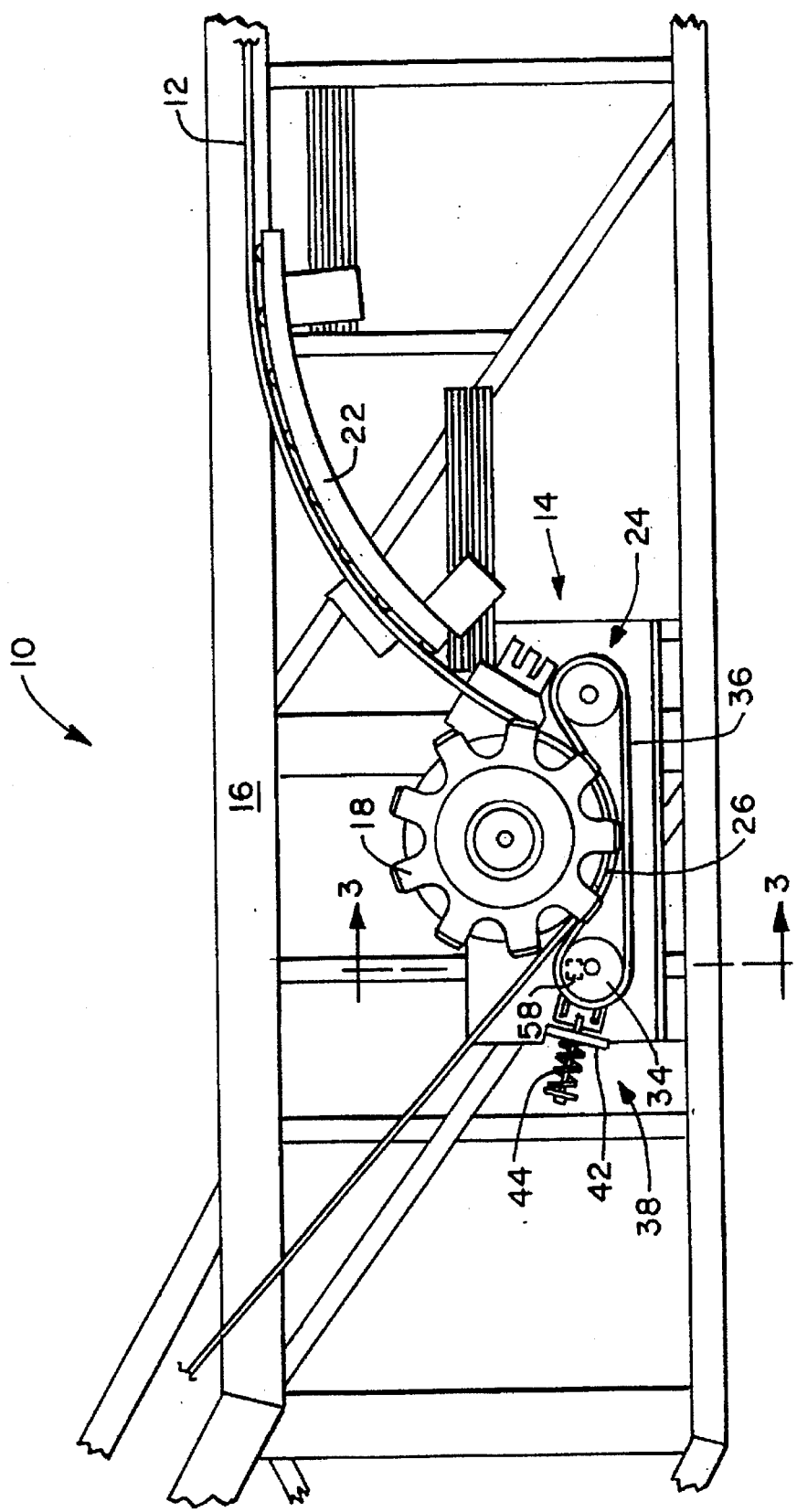
FIG. 1 is a side elevation view of an escalator.

Referring to FIG. 1, the main elements of the escalator 10 are an electric motor (not shown), a plurality of steps (not shown), two handrails 12 (only one shown) spaced on either side the steps, a transmission unit 14 and a frame 16. The electric motor drives the steps and the handrails through the transmission unit.

In the escalator 10 embodiment shown, the transmission unit 14 has two symmetrical sides each having a drive wheel 18, a guide 22 and means for contacting the handrail, such as a pulley assembly 24 all of which are supported by the frame 16. The drive wheel is at a position below and to the left of the guide. Motive force is delivered from the electric motor (not shown) to the drive wheel, as known in the art. The downwardly curved guide supports the handrail 12 and allows the handrail to engage an arc along the outer circumference of the drive wheel.

The means for contacting touches an extended surface 26 of the handrail, which is between the idlers. In the embodiment shown, the means for contacting is the pulley assembly 24 which presses the handrail against the drive wheel 18 so that the drive wheel imparts linear motion on the handrail. In other embodiments the means for contacting may have the sole purpose of facilitating handrail speed monitoring. Thus, a preexisting element may be used as the means for contacting or an element may be introduced into the escalator to be the means for contacting.

The means for contacting which is the pulley assembly 24 includes two idlers 34, a belt 36 and a tension assembly 38. The idlers are disposed on either side of the drive wheel 18. The belt is disposed around the idlers and comes into frictional contact with the handrail 12 along the extended surface 26. The tension assembly assures that the belt is in tension. The tension assembly includes a bracket 42 which engages a portion of the belt adjacent to one of the idlers and a spring 44 which extends between the bracket and the frame 16, as known in the art.

Figure 3:
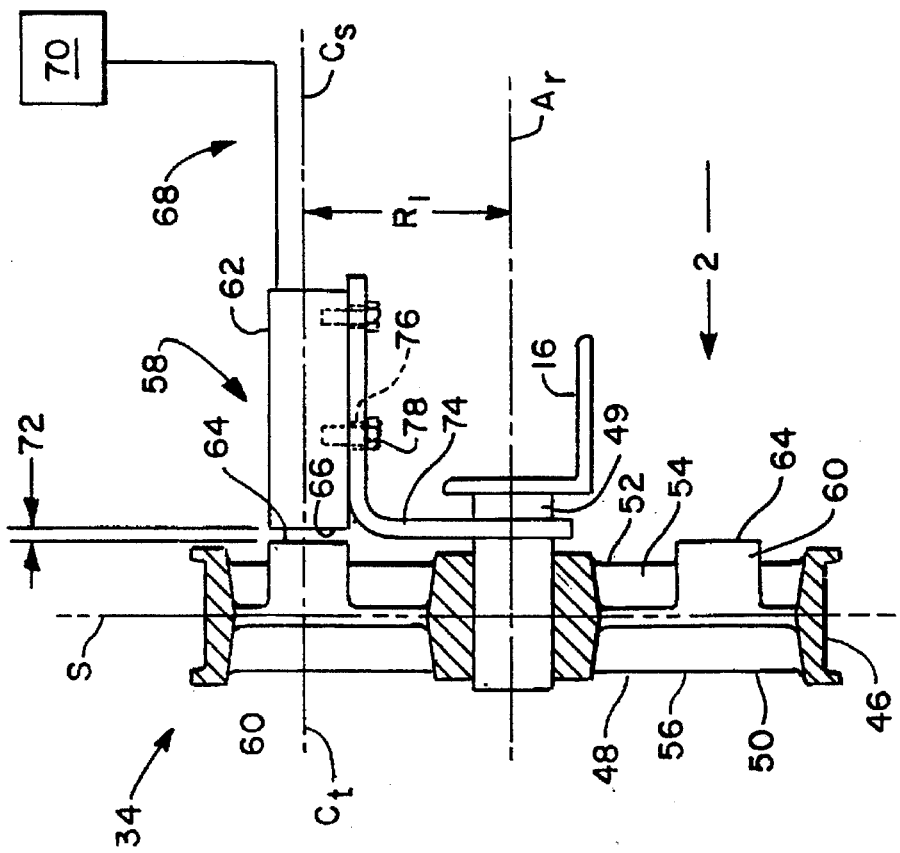
FIG. 3 is a cross-sectional view taken along a line 3—3 of FIG. 1 showing a device for monitoring the speed of a handrail.
Figure 2:
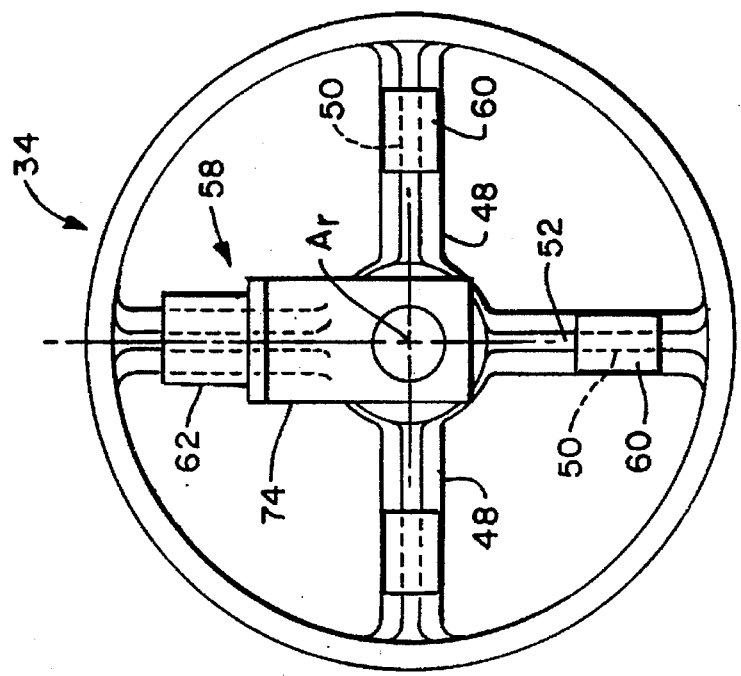
FIG. 2 is an enlarged side elevation view of a device for monitoring the speed of a handrail as seen from the view along a line 2 of FIG. 3.

Now referring the FIGS. 2 and 3, each idler 34 includes an axis of rotation $A_r$, a belt groove 46, a plurality of spokes 48 and an axle 49. The belt groove for securing the belt extends circumferentially about the axis of rotation and attaches to the end of each spoke. Each spoke extends radially from the axis and has a forwardly facing surface 50 (shown in phantom) and a rearwardly facing surface 52. Each axle extends along the axis from a portion of the frame 16 to the idler and supports the idler. Each spoke 48 has a line of symmetry S which extends radially perpendicular to the axis $A_r$. The forwardly facing surface 50 extends from the line S axially to the left. The forwardly facing surface progresses away from the line S with a tapered width. The rearwardly facing surface 52 extends from the line S axially to the right. The rearwardly facing surface has a tapered portion 54 and a flat portion 56.

The escalator 10 incorporates a handrail speed monitoring device 58, which cooperates with the means for contacting or the pulley assembly 24 (See FIG. 1). The device includes means for reflecting a signal (not shown), such as a plurality of targets 60 and means for emitting and receiving the signal, such as a sensor 62. In other embodiments another type of sensor may perform the emitting and receiving functions separately.

The targets 60 are disposed on the flat portion 56 of the rearwardly facing surfaces 52 of one of the idlers 34. In the embodiment shown, the configuration of the idler was modified for receiving the targets using conventional methods. Prior to development of the current invention the rearwardly facing surfaces of the spokes 48 tapered similar to those of the forwardly facing surfaces 50. The metal idler is recast in light of this invention to create a flat portion at the proper location on the spokes for the targets. In other embodiments the geometry of the idler may remain unaltered and another conventional method may be used to attach the targets or the geometry of the idler may be altered in an equivalent way to facilitate attachment of the targets. The conventional means is used to attach the targets.

A centerline $C_t$ extends through each target 60 parallel to the axis of rotation $A_r$. Each target has a reflective surface 64 facing rearwardly.

The material composition of the targets 60 is determined by the sensor 62 type. In the embodiment shown, the sensor is inductive, thus the target is metal of a composition known by those of skill in the art. If the sensor changes the target composition changes accordingly.

The type of sensor 62 and the geometry of the idler 34 primarily determines the number of targets 60. In the present embodiment, there are four (4) targets circumferentially disposed on the rearwardly facing surface 52 of the spokes 48 of the idler associated with the sensor. The inductive sensor requires a target then empty space then another target to get an accurate reading. In other embodiments various factors, such as a desire for more or less accuracy or use of another type of sensor may alter the number of targets.

The sensor 62 has a centerline $C_s$ parallel to the axis of rotation $A_r$. The sensor has a sensing surface 66 which faces the reflective surface 64 of each of the targets 60. In the embodiment shown, a Pepper+Fuschs inductive sensor with the part number NJ15+V4+DW2−1 is used. This type of sensor has internal circuitry (not shown) and external circuitry 68. In other embodiments, an electromagnetic sensor or a photosensor may be used.

The internal circuitry (not shown), as known in the art, includes elements, such as means for determining the frequency of the targets and a time delay relay. In other embodiments using a less sophisticated sensor, the aforementioned functions may be accomplished using circuitry external to the sensor 62. The external circuitry 68, as known in the art, connects the sensor to a controller 70 or an alarm (not shown).

The sensor 62 and the targets 60 of the speed monitoring device 58 have a predetermined radial and axial relationship. In order for the signal (not shown) emitted from the sensor to reflect off of the targets and return to the sensor to be read, the targets must be radially in line with the sensor. Thus, the centerline of the sensor $C_s$ and the centerline of each target $C_t$ must be an equal radial distance $R_1$ from the axis $A_r$.

A gap 72 extends axially between the sensing surface 66 and each reflective surface 64 and defines the axial relationship between the sensor 62 and the targets 60. The sensor type determines an optimal gap size. The optimal gap is the distance where the reflective surfaces of the targets are close enough to the sensing surface to pass through a robust sensing region (not shown) but are far enough from the sensing surface that the targets do not hit the sensor.

The inductive sensor 62 emits a paraboloid-shaped sensing region (not shown). The sensing region is largest at locations closest to the sensing surface 66 and decreases the further away from the sensing surface the targets 60 are positioned. This sensor's sensing region extends fifteen millimeters (15 mm) axially from the sensing surface. In this case, the optimal gap 72 is not less than five millimeters (5 mm) and not greater than eight millimeters (8 mm).

The sensor 62 is supported by a bracket 74 disposed on one of the idler axles 49. In the embodiment shown the bracket is L-shaped and extends first radially through the axis of rotation $A_r$ then parallel to the axis away from the idler 34. In other embodiments the type of bracket may change according to the type of sensor used. Two bolt holes 76 are disposed on the portion of the bracket parallel to the axis and extend radially through the bracket. A bolt 78 extends through each bolt hole to secure the sensor.

The geometry and/or the position of the bracket 74 and the location of the bolt holes 76 may insure that the proper radial and axial relationships between the sensor 62 and the targets 60 are maintained. Although in the embodiment shown two bolts 78 are used to secure the sensor to the bracket another embodiment may vary the number of bolts or the type of fastener.

In operation, the extended surface 26, provides normal forces and frictional forces between the handrail 12 and the belt 36. The normal forces allow the handrail to engage the drive wheel 18 with enough force for the drive wheel to move the handrail linearly. This linear movement is imparted on the belt due to the frictional forces along the extended surface. The belt travels between two idlers 34 which offer no resistance to the belt's linear motion, so the belt and the idlers travel at the same speed as the handrail.

If the belt 36 is allowed to sag the necessary normal forces and frictional forces would no longer exist and the handrail 12 and the belt may not move at the same speed or may not move at all. The tension assembly 38 may prevent this deformation. The bracket 42 engages the belt and the spring 44 may insure that the belt remains in tension during its operative life.

The escalator electric motor (not shown) is preset to run at a nominal speed. The sensor 62 is preset to a speed variation limit that is the nominal speed of the escalator 10 minus a predetermined percentage offset. Regulations require the escalator to be stopped if a fifteen percent (15%) percentage offset from the nominal speed of the escalator is reached. In the present embodiment, the percentage offset is ten percent (10%), which allows a margin of safety higher than the regulations require. Other embodiments, may utilize another percentage offset which still complies with the regulations.

When the escalator 10 is turned on, the controller 70 energizes the sensor 62 and activates the time delay relay (not shown) the escalator to reach the nominal speed. The time delay relay is set to a predetermined delay time. In the present embodiment the delay time is thirty seconds (30 sec). In other embodiments the delay time may be varied.

After thirty seconds (30 sec), the sensor begins monitoring the handrail speed by monitoring the frequency of the targets 60 on the idler 34. The frequency of the targets is indicative of the handrails speed because of the geometry of the idler, as known by those of ordinary skill in the art. If, for any reason, the speed of the handrail goes below the speed variation limit the sensor will activate the time delay relay. If this reduced speed situation remains for more than a predetermined time, in this embodiment two seconds (2 sec), the sensor may signal the alarm (not shown) to sound and may signal the controller 70 to stop the handrail 12 and steps (not shown) simultaneously.

The present invention is the device 58 which monitors the speed of the handrail 12. An advantage of the present invention is the cost. The cost results from the simplicity of the device and the fact that it may utilize a preexisting element of the escalator 10, the pulley assembly 24, which runs at the same speed as the handrail, to mount the targets on rather than constructing an element to perform this function.

Another advantage is the reliability which on the most part results from mounting the targets 60 on one of the idlers 34. The targets always move at a frequency indicative of the handrail speed because the extended surface 26 between the handrail 12 and the belt 36 minimizes the chance of loss of power between the handrail and the belt. Even if one point of the handrail is not joined to the belt, the rest of the extended surface will permit the proper motion to continue. Thus this configuration is uninterrupted by the operative conditions of the escalator 10, such as a change in direction or uneven forces on the handrails.

Reliability is also improved due to the location of the sensor 62 on the bracket 74, because the sensor is mounted at a location which allows the sensor to operate relatively independent from the jostling of the idler 34 and the handrail 12. Although the sensor is fixed on the axle 49 of the idler, so not completely independent, the belt 36 adsorbs much of the vibrations caused by the handrail 12. Thus, the sensor is not interfered with by the handrail.

Another advantage of the present invention is the permanence of the sensor's position, which results from mounting the sensor 62 relatively independent of the idler 34 and the handrail 12 which allows the sensor to require no adjustment during its operative life.

Although the invention has been shown and described with respect to a best mode embodiment thereof, it should be understood by those skilled in the art that various other changes, omissions and additions in the form and detail thereof may be made therein without departing from the spirit and scope of the claimed invention.

We claim:

1. A handrail speed monitoring device for determining the speed of an escalator handrail having a pulley assembly having a plurality of idlers and a belt around the idlers that contacts the handrail along an extended surface so the belt moves at the same speed as the handrail uninterrupted by the operative conditions of the escalator; said device comprising:

(a) means for reflecting a signal mounted at various locations on one of the idlers; and (b) means for emitting and receiving the signal indicative of the handrail speed adjacent to the targets and not interfered with by the handrail.

2. An escalator, comprising:

a balustrade having a handrail;

means for driving said handrail;

a means for engaging said handrail with said drive, said engaging means including a first idler pulley;

a second idler pulley, separated a distance from said first idler pulley; and a belt, wrapped around said pulleys;

wherein said engaging means is positioned adjacent said means for driving such that said pulleys are not in contact with said handrail, and said belt engages said handrail with said means for driving along an extended surface of said belt, thereby causing said belt and pulleys to move at a speed related to that of said handrail; and a sensor for sensing the rotational speed of one of said idler pulleys;

wherein sensing the speed of said engaging means, enables said sensor to indicate the speed of said handrail without being interfered with by said handrail.

3. The escalator of claim 2, wherein said sensor includes:

means for reflecting a signal mounted on one of said pulleys at spaced intervals said reflected signal having at a frequency indicative of the handrail speed; and means for emitting and receiving the signal cooperating with said means for reflecting the signal.

4. A handrail speed monitoring device for determining the speed of an escalator handrail, comprising:

means for contacting the handrail, said means having an extended, uninterrupted surface in contact with, and moving at the same speed as the handrail, uninterrupted by the operative conditions of the escalator; and a sensor assembly cooperating with said means for contacting to sense the speed of said means for contacting;

wherein said sensor assembly is not interfered with by said handrail.

5. A handrail speed monitoring device according to claim 4, wherein the sensor assembly further includes:

means for reflecting a signal mounted on said means for contacting at spaced intervals said reflected signal having at a frequency indicative of the handrail speed; and means for emitting and receiving the signal cooperating with said means for reflecting the signal.

6. A handrail speed monitoring device according to claim 4, wherein said means for contacting the handrail comprises:

a first pulley;

a second pulley; and an endless belt, mounted around said pulleys, said belt for contacting the handrail along an extended surface of said belt, such that said belt moves at the same speed as the handrail uninterrupted by the operative conditions of the escalator.

7. A handrail speed monitoring device according to claim 6, wherein the sensor assembly further includes:

means for reflecting a signal mounted on said means for contacting at spaced intervals said reflected signal having at a frequency indicative of the handrail speed; and means for emitting and receiving the signal cooperating with said means for reflecting the signal.

* * * * *